Patented Sept. 4, 1951

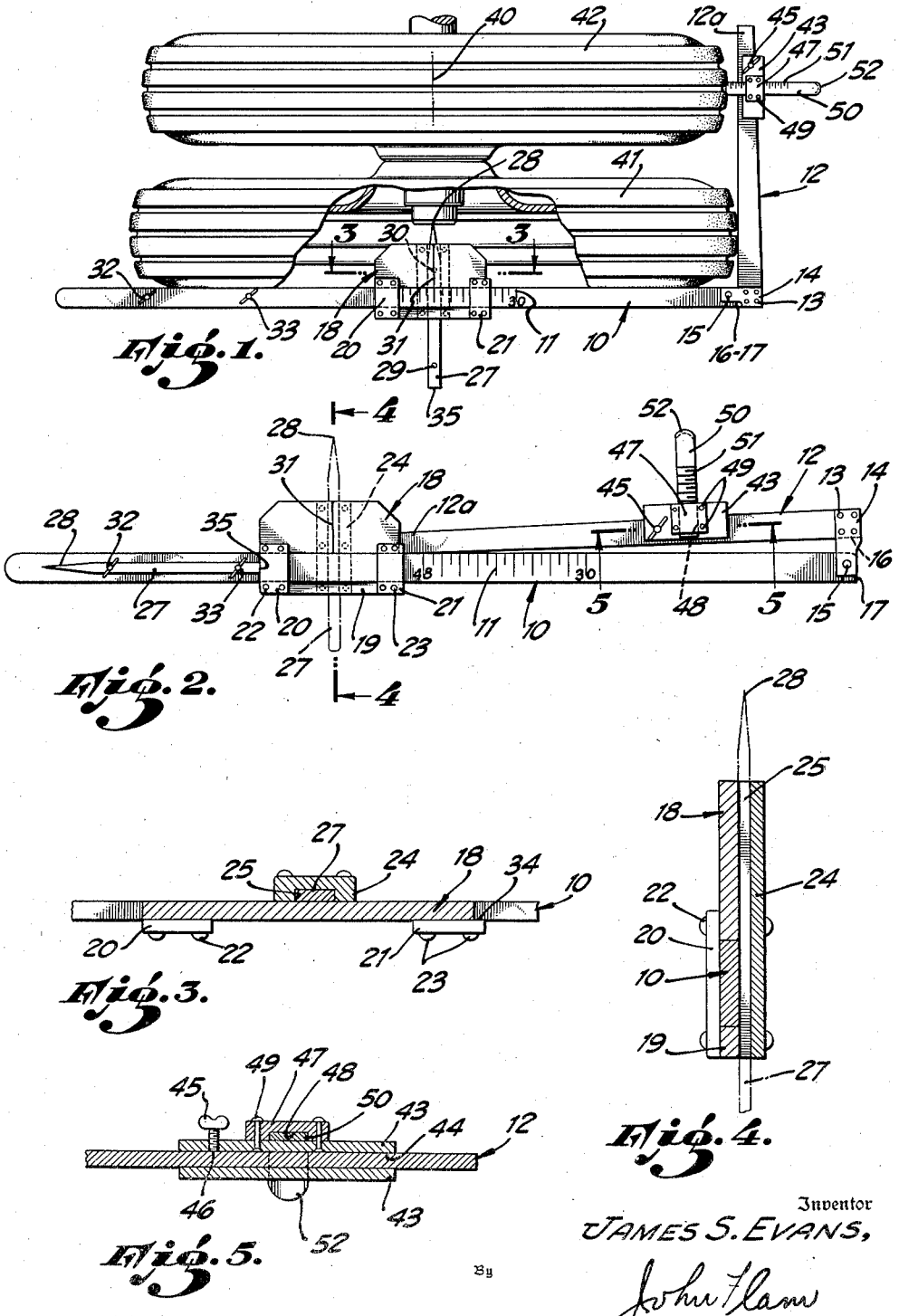

2,566,407

UNITED STATES PATENT OFFICE 2,566,407

FOLDABLE TIRE DIAMETER GAUGE

James S. Evans, San Marino, Calif.

Application March 10, 1947, Serial No. 733,460

6 Claims. (Cl. 33—178)

This invention relates to tire measuring devices, and more particularly to a foldable type of tire gauge for use in obtaining the diameter of dual or plural truck tires.

Dual tires are apt to wear unevenly; and it is necessary at times to remove and replace one of the tires so that the diameters are made substantially equal, thus ensuring proper traction on both tires.

One of the objects of this invention is to provide an improved tire diameter gauge for dual truck tires for determining the diameter of the larger tire, and that is foldable quickly from an operative position to a compact, easily handled unit, capable of storage in a conventional operator's kit.

Another object of this invention is to provide a tire diameter gauge having the tire feeler and centering device so arranged with respect to the graduated bar portion that they may be foldably secured thereon to form a compact unit easily stored when not in use.

Still another object of this invention, is in the provision of a foldable tire measuring device for dual truck tires, said device having the tire feeler and sliding tire centering device arranged on a graduated bar member in such manner that they are quickly movable from extended operative position to a folded non-sliding position on the bar.

Still another object of this invention is to provide an improved tire diameter gauge for dual truck tires for determining the diameter of both tires, and that is foldable quickly from an operative position to a compact, easily handled unit, capable of storage in a conventional operator's kit.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a plan view showing the tire diameter gauge in operative position on the dual tires;

Fig. 2 is a plan view showing the tire diameter gauge in its folded position;

Fig. 3 is a sectional view taken on the plane 3—3 of Fig. 1;

Fig. 4 is a sectional view taken on the plane 4—4 of Fig. 2; and

Fig. 5 is a sectional view taken on the plane 5—5 of Fig. 2.

Before referring to the drawings, it might be well to explain that the foldable tire measuring device is particularly adapted for use in measuring the diameter of dual or plural truck tires. Of course, the device is readily adapted for use in measuring the diameter of conventional motor vehicle tires, but its use becomes more pertinent when truck tires are concerned.

It is well known that dual or plural truck tires, when mounted for use, must have the same diameters for efficient operation. Both truck tires must provide substantially the same traction surface to prevent overloading and excess wear upon a tire having a larger diameter than the adjacently disposed casing. This wear is due, not only to the heavy loads carried, but also to excess wear on tires mounted upon the driving axle of the truck or tractor.

Truck operators and owners usually have on hand a plurality of truck tires or casings of varied diameters. In order to take care of this situation, and to ensure the efficient mounting of new, repaired, or recapped casings, there is provided herein a foldable, easily stored tire diameter gauge.

A bar 10 of rectangular section is provided, having the graduations 11 thereon, indicating various diameters of tires capable of measurement by the device. A tire feeler 12 has vertically secured thereto, by means of the plural connecting means 13, right-angularly disposed connecting portions 14 in the form of straps disposed on each side of the feeler bar 12. Connecting portion 14 is pivotally mounted, as shown at 15, near the outer end of the before mentioned bar 10. The pivotal mounting of the tire feeler upon the bar 10 is so arranged (Fig. 2) that the surface 16 of said feeler will lie flush against the end 17 of the bar when the device is in an operative position (Fig. 1).

A slide or measuring plate 18 rests on top of bar 10 and is of the same thickness as bar 10. The slide is held in proper position by the aid of a lower strip 19 connected to the slide by means of dual spaced straps 20 and 21 secured to the spaced portions in plural manner 22 and 23, respectively. Strap 21 purposely overhangs the edge of slide 18. The slide 20 is further confined by the long strap 24 attached to the back of the slide and to the back of bar 19. This strap 24 vertically grooved to form a rectangular channel 25. This channel slidably accommodates a flat centering pin 27. The graduated bar 10 is slidable between the slide or plate 18, and strip 19. Centering pin 27 is pointed as at 28, said pin being apertured at the dual points 29 and 30, intermediate its length.

A centering line 31, marked on the plate 18, cooperates with the graduations on the bar for determining tire diameter, when the slide structure 18—19 is adjusted to bring the point of the pin 27 on the axis 40 of the tires 41, 42.

Centering pin 27 is adapted, when not in use, to be secured by means of cooperating wing screws 32 and 33, on the graduated bar 10 (Fig. 2). The tire feeler 12 may be folded upon the bar 10 with its outer end 12—a engaging the right-hand edge of slidable plate 18 and the projecting edge 34 of strap 21 (Fig. 3). The slide plate 18 is held in fixed position on the bar because of pressure applied upon its opposite side by the abutting end 35 of the centering pin 27 secured to bar 10 by means of the detachable connections 32 and 33 (Fig. 2).

A cooperating gauge member is also provided for simultaneously measuring the diameter of dual truck tires. It is necessary at times quickly to determine not only the size of a single tire, but the difference in the diameters of the tires.

This is accomplished by having a supplemental gauge on the tire feeler 12, slidable thereon for engagement with either of the tires. This gauge determines the difference in tire diameter and obviously engages the smaller tire tread. With the difference in diameter known, it is, of course, a simple matter to calculate the size of the smaller tire by reference to the main gauge.

A slide 43 grooved at 44 is slidable on feeler 12. Means for fixedly positioning the clamp on the tire feeler adjacent the smaller of the dual tires is provided by wing screw 45 threadedly mounted in slide 43 and having its inner end 46 operatively engaging member 12.

A guide plate 47, grooved at 48, is fastened in the plural manner 49 to slide 43. A tire engaging gauge member 50 is frictionally mounted in the groove 48, said member having the graduations 51 thereon. This member is provided with a handle end 52. The graduations read in connection with an edge of tire feeler 12 or plate 47, give the difference in size of the dual tires. Inasmuch as the diameter of the larger tire has been determined by the main gauge, it is a relatively simple matter to immediately ascertain the diameter of the smaller tire.

The operation of the tire measuring device is believed quite clear from consideration of Fig. 1 of the drawings. The upper edge of bar 10 is placed squarely against the side of the outer tire 41. Slide 18 is accommodated inside the tire rim. The pin 27 is there adjusted to fit on the axis 40. The tire feeler 12 has been moved to a position against the tread of the dual tire 41, having the greater diameter; namely, the outer one. The operator may then visually determine the diameter of the casing by reading the cooperative graduations opposite line 31 on the slide 10. A tire of the same diameter must obviously be chosen for operative mounting.

The inner tire 42 is of less diameter than the outer casing, and by merely fixing the clamp 43 adjacent the inner tire and moving the member 50 against the tire tread, the difference in size of the tire is immediately ascertained. This measurement when compared with the reading on the main gauge gives accurately the diameter of the smaller casing.

The inventor claims:

1. A tire measuring device including: a graduated bar; a slide on said bar; a centering device detachably carried by the slide and extending transversely of said bar; a tire feeler member pivoted to the bar for movement to a right angular position and to a folded relation thereon; and means for securing the centering device on the bar when not in use in position to confine the slide against movement along said bar.

2. A foldable tire measuring device including: a bar graduated for tire measurement; a measuring device slidable on the graduated bar and cooperating therewith for quickly determining tire diameters; a tire feeler pivotally mounted on one end of said bar for movement to a fixed right angle position, and to a folded position with its end adjacent said measuring device; a centering device detachably mounted on said measuring device at right angles to the bar; and means for attaching the centering device on the bar in position to confine said measuring device and feeler against movement.

3. In a tire diameter gauge: a bar having graduations thereon, a slide having a mark thereon cooperating with the graduations; a feeler member pivoted at one end of the bar and having a feeler surface; said member and bar having cooperating surfaces for positioning the member so that its feeler surface is parallel with the graduations and the mark; a centering device detachably mounted in the slide and having a centering point lying in a plane including the mark; and means for attaching the centering device to the bar when said device is not in use; the slide, when the feeler member is folded and the centering device is attached to the bar, being confined against movement by said member and device.

4. In a tire diameter gauge: a measuring bar; a slide thereon; graduations on said bar and slide cooperatively associated to determine variable tire diameters; a feeler member pivoted at one end of the bar and having a tire tread engaging surface; said member and bar having cooperating surfaces for positioning the member so that its tread engaging surface is parallel with the graduations on said bar and slide; a centering device detachably mounted in the slide and having a centering point; and means for attaching the centering device to the bar when said device is not in use; the slide, when the feeler member is folded and the centering device is attached to the bar, being confined against movement by said member and device.

5. A dual tire measuring device including: a bar graduated for larger tire diameter measurement; a slide member thereon; a centering device adjustably mounted on said slide for movement at right angles to said bar; a tire feeler member pivoted on the bar having a straight edge movable to an operative right-angular position and to a folded position on said bar; and a supplemental adjustable gauge member on said tire feeler for measuring the diameter of the smaller tire.

6. In a dual tire diameter gauge: a measuring bar; a slide thereon; graduations on said bar and slide cooperatively associated to determine larger tire daimeter; a feeler member pivoted at one end of the bar and having a tire tread engaging surface; said member and bar having cooperating surfaces for positioning the member so that its tread engaging surface is parallel with the graduations on said bar and slide; a centering device detachably mounted in the slide and having a centering point; and means for attaching the centering device to the bar when said device is not in use; the slide, when the feeler member is folded and the centering device is attached to the bar, being confined against movement by said member and device; and a supplemental adjustable gauge member on said feeler member for determining the diameter of the smaller tire.

JAMES S. EVANS.

REFERENCES CITED

The following references are of record in the file of this patent:

UNITED STATES PATENTS

| Number | Name | Date |
|---|---|---|
| 18,974 | Hoke | Dec. 29, 1857 |
| 451,053 | Jackman | Apr. 28, 1891 |
| 633,362 | Maidhof | Sept. 19, 1899 |
| 794,031 | Lehman | July 4, 1905 |
| 1,245,213 | Gammeter | Nov. 6, 1917 |
| 1,286,312 | Hertle | Dec. 3, 1918 |
| 1,737,827 | Ciliske | Dec. 3, 1929 |

FOREIGN PATENTS

| Number | Country | Date |
|---|---|---|
| 49,559 | Germany | Nov. 15, 1889 |
| 51,013 | Germany | Feb. 25, 1890 |
| 750,286 | France | Aug. 8, 1933 |